United States Patent [19]

Capps

[11] Patent Number: 4,978,950

[45] Date of Patent: Dec. 18, 1990

[54] GREY-SCALE REPRESENTATION USING BINARY SPATIAL LIGHT MODULATORS IN COHERENT OPTICAL PROCESSOR

[75] Inventor: C. David Capps, Seattle, Wash.

[73] Assignee: The Boeing Company, Seattle, Wash.

[21] Appl. No.: 380,103

[22] Filed: Jul. 14, 1989

[51] Int. Cl.[5] .......................... H04N 1/46; G09G 3/20
[52] U.S. Cl. ................................. 340/783; 340/793;
358/298; 350/169; 350/174; 350/376; 455/608;
365/122; 369/116
[58] Field of Search ............... 340/793, 752, 783, 796;
358/298; 350/169, 173, 174, 375, 376; 455/608,
616; 365/122; 369/116, 118

[56] References Cited

U.S. PATENT DOCUMENTS

| | | | |
|---|---|---|---|
| 3,965,299 | 6/1976 | Lin | 178/7.3 D |
| 3,971,887 | 7/1976 | Lin et al. | 178/7.3 D |
| 4,093,964 | 6/1978 | Aughton | 358/302 |
| 4,110,796 | 8/1978 | Aughton | 358/298 |
| 4,268,871 | 5/1981 | Kawamura | 358/298 |
| 4,471,351 | 9/1984 | Anderson | 340/783 |
| 4,476,465 | 10/1984 | Anderson | 340/783 |
| 4,495,492 | 1/1985 | Anderson | 340/783 |
| 4,517,608 | 5/1985 | Maeda | 358/298 |
| 4,575,722 | 3/1986 | Anderson | 340/783 |
| 4,661,809 | 4/1987 | Anderson | 340/783 |
| 4,714,325 | 12/1987 | Hill | 350/376 |

Primary Examiner—Nelson Moskowitz
Attorney, Agent, or Firm—Christensen, O'Connor, Johnson & Kindness

[57] ABSTRACT

A spatial light modulation technique for a coherent optical processor, permitting binary spatial light modulators to represent a range of grey levels. The technique modulates a coherent input beam at a plurality of spatially separate image pixels, to produce a modulated beam having the image pixels spatially encoded thereon. The input beam is divided into N sub-beams, each of which is passed through a separate binary spatial light modulator to produce a modulated sub-beam. Each binary spatial light modulator comprises an array of sub-pixels, each of which either blocks or passes a portion of the sub-beam. One sub-pixel of each binary modulator corresponds to each image pixel. The modulated sub-beams are then combined. Weighting means are provided for modifying the intensity of light following the sub-beam paths by selected weighting values. The weighting values form a series in which each of $N-1$ weighting values differs from the preceding weighting value by a factor of 4.

9 Claims, 2 Drawing Sheets

GREY-SCALE REPRESENTATION USING BINARY SPATIAL LIGHT MODULATORS IN COHERENT OPTICAL PROCESSOR

FIELD OF THE INVENTION

The present invention relates to coherent optical processing and, in particular, to a technique for implementing a coherent optical processor using binary spatial light modulators so as to enable the use of multilevel (grey-scale) modulation.

BACKGROUND OF THE INVENTION

Spatial light modulators (SLMs) have long been used as input devices for coherent optical processors. They perform this function by spatially modulating a laser beam so that a two-dimensional image is encoded on the beam. One difficulty in using coherent optical processors in a wide variety of applications is the limitation of currently available spatial light modulators.

There are basically two approaches to SLM technology: magneto-optic devices and devices using liquid crytal material. Magneto-optic SLMs have high frame rates, excellent uniformity, and induce very little phase distortion in a laser beam. However, they are limited to binary states, i.e., transmitting or contransmitting, for each pixel. Liquid crystal devices on the other hand can represent a range of grey levels, but are much slower that magneto-optic devices, are less uniform, and introduce phase distortions which are proportional to the grey level at each pixel. As a result, magneto-optical devices are desirable from a practical viewpoint, but many applications require more than one bit of encoding per pixel.

SUMMARY OF THE INVENTION

The present invention provides a spatial light modulation technique for a coherent optical processor. The invention is implemented using binary SLMs, but is capable of representing a range of grey levels. The present invention thereby provides a spatial light modulator that can achieve high frame rates, high uniformity and low distortion, but that is not limited to binary modulation.

In one preferred aspect, the present invention provides a spatial modulation means adapted for use in a coherent optical processing system. The spatial modulation means receives an input beam of light, and spatially modulates the input beam at a plurality of spatially separate image pixels, to produce a modulated beam having the image pixels spatially encoded thereon. The spatial modulation means comprises means for dividing the input beam into N sub-beams directed along N respective sub-beam paths, and N binary spatial light modulators. Each spatial light modulator comprises an array of sub-pixels, and is positioned in one of the sub-beam paths so that it receives the sub-beam and convert it into a modulated sub-beam. Each sub-pixel either blocks or passes a portion of the sub-beam. One sub-pixel of each of the N spatial light modulators corresponds to each image pixel.

The modulated sub-beams produced by the spatial light modulators are combined to produce the modulated beam such that for each image pixel, light that has passed through the N corresponding sub-pixels is spatially combined. The optical path length from input beam to modulated beam is the same along each sub-beam path. Weighting means are provided for modifying the intensity of the light following the N sub-beam paths by selected weighting values. The weighting values form a series in which each of $N-1$ weighting values differs from the preceding weighting value by a factor of 4.

DETAILED DESCRIPTION OF THE INVENTION

Figure 1:
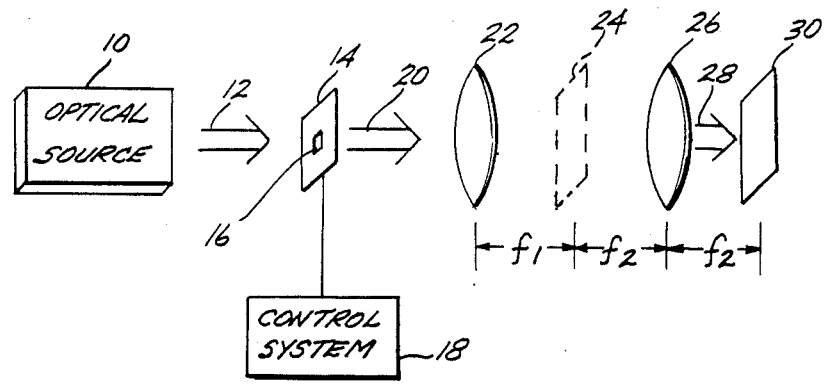
FIG. 1 is a schematic view of coherent optical processor.

FIG. 1 presents a schematic view of a coherent optical processor. The processor includes optical source 10 that produces a coherent input beam 12. Typically, the source comprises a laser and beam expansion optics. Input beam 12 is incident onto spatial light modulator 14 that comprises an array of image pixels 16. In response to control signals received from control system 18, each image pixel modulates the intensity of the portion of the input beam that strikes the image pixel. As a result, the spatial light modulator produces a modulated beam 20 onto which an image is encoded.

Modulated beam 20 is received by transform lens 22. The transform lens focuses the modulated beam onto Fourier plane filter 24, and the light passing through filter 24 is recollimated by imaging lens 26, to produce an output beam 28. The output beam is incident onto a detector array 30 that comprises a rectangular array of photodetectors. A complete system would also typically include suitable electronics for reading the detected intensity values from photodetector array 30.

Filter 24 is positioned at a distance of $f_1$ from transform lens 22, $f_1$ being the focal length of the transform lens. Imaging lens 26 is located at a distance of $f_2$ from filter 24 and from detector array 30, $f_2$ being the focal length of the imaging lens. Transform lens 22 in effect images the far-field diffraction pattern of modulator 16 onto filter 24, the far-field diffraction pattern comprising the two-dimensional spatial Fourier transform of the modulator. By selectively blocking, attenuating, or passing certain portions of such diffraction pattern, filter 24 in effect removes certain spatial frequencies from the beam. The light emerging from the filter is imaged by lens 26 onto detector array 30. This can be viewed as a second diffraction process, in which lens 26 images the diffraction pattern of filter 24 onto the detector array. This process performs an inverse Fourier transform, such that the optical intensity pattern at the detector array corresponds to the optical intensity pattern of modulator 14, as modified by the spatial frequency selection produced by filter 24.

Figure 2:
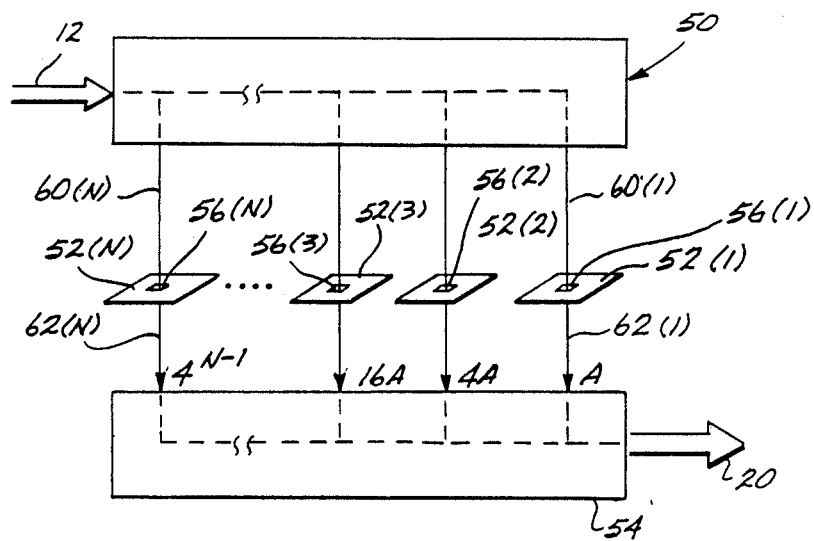
FIG. 2 is a schematic view of a spatial light modulator according to the present invention.

The spatial light modulator provided by the present invention is illustrated in schematic form in FIG. 2. The modulator comprises beam divider 50, a plurality of N binary spatial light modulators 52(1)–52(N), and beam combiner 54. Beam divider 50 receives coherent input beam 12, and divides the input beam into N sub-beams 60(1)–60(N) travelling along N separate sub-beam paths. Each of sub-beams 60 passes through a different one of binary modulators 52, such that N modulated sub-beams 62(1)–62(N) are produced. Modulated sub-beams 62 are combined by optical combiner 54, to produce modulated beam 20.

Each of binary modulators 52(1)–52(N) comprises an array of sub-pixels, respective sub-pixels 56(1)–56(N) being illustrated in FIG. 2. As described below, one sub-pixel 56 from each binary modulator 52 corresponds to each image pixel 16 of FIG. 1. Each sub-pixel 56 either passes or blocks a portion of the corresponding sub-beam 60. Thus in the illustrated transmission embodiment, each sub-pixel is either transmitting or non-transmitting at any given time. In addition to the modulation produced by the binary modulators, beam divider 50 and/or beam combiner 54 modify the intensity of the light following each sub-beam path by selected weighting values. The weighting values are chosen such that they form a series in which each of N−1 weighting values differs from the preceding weighting value by a factor of 4. Thus the weighting values form a power series A, 4A, 16A, . . . $4^{N-1}$A, with A being any arbitrary weighting value. In addition, the beam divider and combiner are constructed such that the light following each sub-beam path travels an identical distance between input beam 12 and modulated beam 20. Finally, beam combiner 54 aligns the modulated sub-beam with one another such that for each image pixel 16, light that has passed through the N corresponding sub-pixels 56 is spatially combined. The reasons for these conditions are described below.

The modulation process may be described in terms of an electric field amplitude function E of two spatial variables x and y. This function can be represented as a binary decomposition as follows:

$$E(x,y) = \sum_{k=1}^{N} f_k(x,y) 2^{k-1} e^{i\phi} \quad (1)$$

The functions $f_k(x,y)$ are two-dimensional functions which have only two values, zero or one. Thus each $f_k$ can be represented by one of binary modulators 52, with each pair of x and y values corresponding to one of sub-pixels 56, and each value of k corresponding to one of binary modulators 52. In the apparatus of FIG. 2, the field amplitude function E' in modulated beam 20 can be represented as follows:

$$E'(x,y) = \sum_{k=1}^{N} \frac{E_0}{N} f_k(x,y)(1/2)^{N-k+1} e^{i\phi} \quad (2)$$

In Equation (2), the term $E_0/N$ represents the division of input beam 12 into equal intensity sub-beams 60, the function $f_k$ represents binary spatial light modulators 52, the factor $(\frac{1}{2})^{N-k+1}$ represents the attenuation or other amplitude modification produced by the beam divider and/or combiner, and the term $e^{i\phi}$ represents the phase of each sub-beam. Moving common factors to the front of the summation results in:

$$E'(x,y) = \frac{E_0}{N2^N} \sum_{k=1}^{N} f_k(x,y) 2^{k-1} e^{i\phi} \quad (3)$$

Since the sub-beam path lengths are equal to one another, the field amplitudes of the sub-beams add coherently when the sub-beams are combined. Thus Equation (3) will match the desired decomposition shown in Equation (1) when the field amplitudes are attenuated or otherwise modified (by means other than the binary modulators) according to the power series $2^{k-1}$, or when the intensities of the sub-beams are modified according to the power series $(2^{k-1})^2$, since intensity is equal to the square of the amplitude of a light beam. Thus, the desired relative intensity weighting of the sub-beams is specified by the power series $4^{k-1}$.

Figure 3:
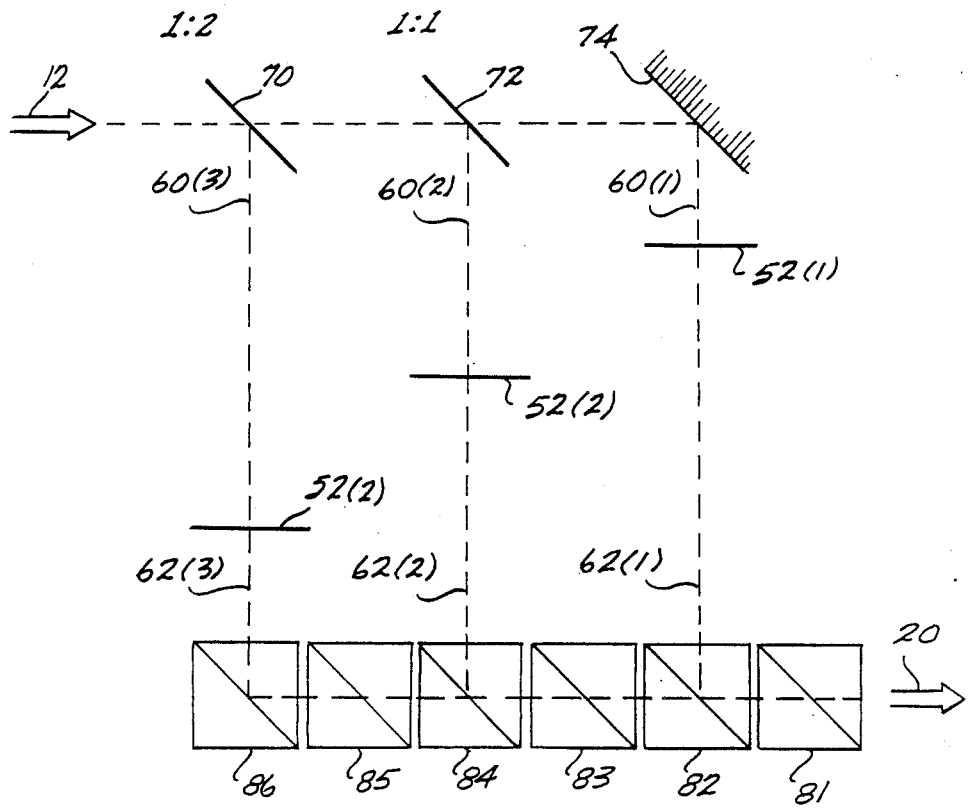
FIG. 3 illustrates a preferred embodiment with the spatial light modulator shown in FIG. 2.

FIG. 3 schematically illustrates a preferred embodiment for the implementation of the spatial light modulator shown in FIG. 2. In the three-channel embodiment shown in FIG. 3, input beam 12 is divided into sub-beams 60(1)–60(3) by beamsplitters 70 and 72 and mirror 74. Beamsplitter 70 is a 1:2 beamsplitter, such that sub-beam 60(3) contains one-third of the power of input beam 12. Beamsplitter 72 is a 1:1 beamsplitter, such that sub-beam 60(2) also includes one-third of the power of the input beam. The remaining power transmitted by beamsplitter 72 is reflected by mirror 74 to produce sub-beam 60(1). In general, for an N sub-beam embodiment, the beamsplitters should have ratios of 1:1, 1:2 . . . 1:(N−1), to produce sub-beams of equal intensity.

Modulated sub-beams 62(1)–62(3) are combined by beamsplitters 81–86. In the illustrated arrangement, sub-beam 62(1) passes through two such beam-splitters 81 and 82, sub-beam 62(2) passes through four such beamsplitters, while sub-beam 62(3) passes through six such beamsplitters. Each of beam-splitters 81–86 is a 1:1 beam splitter, so that each beam splitter attenuates light passing through it by a factor of $\frac{1}{2}$. Therefore, the relative attenuations applied to the modulated sub-beams 62 follow the power series $\frac{1}{4}$, 1/16, 1/64, to produce the desired relative attenuation prescribed by Equation (3). In this embodiment, all of the sub-beam weighting is performed by the beam combiner comprising beamsplitters 81–86. However, the weighting could be performed in the beam divider or in any other position in the apparatus, to achieve the prescribed power of 4 spacing between the relative weighting values.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. In a coherent optical processor comprising means for producing a coherent input beam of light, spatial modulation means for receiving the input beam and for spatially modulating the input beam at a plurality of spatially separate image pixels to produce a modulated beam having the image pixels spatially encoded thereon, and a transform lens for receiving the modulated beam, the improvement wherein the spatial modulation means comprises:

means for dividing the input beam into N sub-beams directed along N respective sub-beam paths;

N binary spatial light modulators, each binary spatial light modulator comprising an array of sub-pixels and being positioned in one or the sub-beam paths so as to receive the sub-beam and convert it into a modulated sub-beam, each sub-pixel either blocking or passing a portion of the sub-beam, one sub-pixel of each of the N binary spatial light modulators corresponding to each image pixel;

means for combining the modulated sub-beams to produce the modulated beam and for directing the modulated beam onto the transform lens, the sub-beams being combined such that for each image pixel, light that has passed through the N corresponding sub-pixels is spatially combined;

the optical path length from input beam to modulated beam being the same along each sub-beam path; and weighting means for modifying the intensity of the light following the N sub-beam paths by selected weighting values, the weighting values forming a series in which each of N−1 weighting values differs from the preceding weighting value by a factor of 4.

2. The improvement of claim 1, wherein each binary spatial light modulator comprises a magneto-optic spatial light modulator.

3. The improvement of claim 1, wherein the means for dividing the input beam comprises N−1 beamsplitters and one mirror, the beamsplitters having ratios of 1:1, 1:2 . . . 1:(N−1).

4. The improvement of claim 1, wherein the means for combining and the weighting means comprise 2N 1:1 combining beamsplitters, sub-beams 1,2 . . . N passing through 2,4 . . . 2N combining beamsplitters respectively.

5. A spatial light modulator for receiving a coherent input beam of light and for spatially modulating the input beam at a plurality of spatially separate image pixels to produce a modulated beam having the image pixels spatially encoded thereon, the spatial light modulator comprising:

means for dividing the input beam into N sub-beams directed along N respective sub-beam paths;

N binary spatial light modulators, each binary spatial light modulator comprising an array of sub-pixels and being positioned in one of the sub-beam paths so as to receive the sub-beam and converted into a modulated sub-beam, each sub-pixel either blocking or passing a portion of the sub-beam, one sub-pixel of each of the N binary spatial light modulators corresponding to each image pixel;

means for combining the modulated sub-beams to produce the modulated beam such that for each image pixel, light that has passed through the N corresponding sub-pixels is spatially combined;

the optical path length from input beam to modulated beam being the same along each sub-beam path; and weighting means for modifying the intensity of the light following the N sub-beam paths by selected weighting values, the weighting values forming a series in which each of N−1 weighting values differs from the preceding weighting value by a factor of 4.

6. The spatial light modulator of claim 5, wherein each binary spatial light modulator comprises a magneto-optic spatial light modulator.

7. The spatial light modulator of claim 5, wherein the means for dividing the input beam comprises N−1 beamsplitters and one mirror, the beam-splitters having ratios of 1:1, 1:2 . . . 1:(N−1).

8. The spatial light modulator of claim 5, wherein the means for combining and the weighting means comprise 2N 1:1 combining beamsplitters, sub-beams 1,2 . . . N passing through 2,4 . . . 2N combining beamsplitters respectively.

9. A method of spatially modulating an input beam at a plurality of spatially separate image pixels to produce a modulated beam having the image pixels spatially encoded thereon, the method comprising:

dividing the input beam into N sub-beams directed along N respective sub-beam paths;

passing each sub-beam through a binary spatial light modulator, each binary spatial light modulator comprising an array of sub-pixels and being positioned in one of the sub-beam paths so as to receive the sub-beam and convert into a modulated sub-beam, each sub-pixel either blocking or passing a portion of the sub-beam, one sub-pixel of each of the N binary spatial light modulators corresponding to each image pixel;

combining the modulated sub-beams to produce the modulated beam such that for each image pixel, light that has passed through the N corresponding sub-pixels is spatially combined;

the optical path length from input beam to modulated beam being the same along each sub-beam path; and causing the light following the N sub-beam paths to have its intensity modified by selected weighting values, the weighting values forming a series in which each of N−1 weighting values differs from the preceding weighting value by a factor of 4.

* * * * *